| (12) | United States Patent | (10) Patent No.: | US 8,787,533 B2 |
|---|---|---|---|
| | MacDonald | (45) Date of Patent: | Jul. 22, 2014 |

(54) SYSTEM AND METHOD FOR PLACING A PHONE CALL THROUGH A SELECTED TELECOMMUNICATIONS NETWORK

(75) Inventor: Douglas James MacDonald, Carp (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 919 days.

(21) Appl. No.: 12/657,138

(22) Filed: Jan. 13, 2010

(65) Prior Publication Data

US 2010/0189236 A1    Jul. 29, 2010

Related U.S. Application Data

(60) Provisional application No. 61/205,946, filed on Jan. 26, 2009.

(51) Int. Cl.
   *H04M 1/64*    (2006.01)
   *H04M 1/56*    (2006.01)

(52) U.S. Cl.
   USPC ........................................ 379/69; 379/142.01

(58) Field of Classification Search
   USPC ........................................................... 379/67
   See application file for complete search history.

(56) References Cited

U.S. PATENT DOCUMENTS

| 5,278,890 A | * | 1/1994 | Beeson et al. | 340/7.24 |
| 5,732,348 A | * | 3/1998 | Norimatsu | 455/434 |
| 5,903,629 A | * | 5/1999 | Campbell et al. | 379/88.24 |
| 6,373,817 B1 | * | 4/2002 | Kung et al. | 370/217 |
| 6,424,711 B1 | * | 7/2002 | Bayless et al. | 379/355.09 |
| 6,535,730 B1 | * | 3/2003 | Chow et al. | 455/416 |
| 6,751,297 B2 | * | 6/2004 | Nelkenbaum | 379/88.13 |
| 6,754,181 B1 | * | 6/2004 | Elliott et al. | 370/252 |
| 7,031,443 B2 | * | 4/2006 | St-Onge et al. | 379/88.17 |
| 2002/0132638 A1 | | 9/2002 | Plahte et al. | |
| 2003/0227902 A1 | | 12/2003 | Lindquist | |
| 2005/0041647 A1 | * | 2/2005 | Stinnie | 370/352 |
| 2007/0223401 A1 | * | 9/2007 | Chatterjee et al. | 370/261 |

FOREIGN PATENT DOCUMENTS

WO    WO 2007/042862 A1    4/2007

OTHER PUBLICATIONS

"Adore Infotech" Adore Web Paper; www.adoreinfotech.com/callback.html; copyright 2005 Adore Infotech Pvt Ltd.

* cited by examiner

*Primary Examiner* — Joseph T Phan (57) ABSTRACT

A system and method for placing a phone call through a selected telephone network is disclosed. A member submits a source phone number and a destination phone number to an application server in the selected telephone network. The member's class of service (COS) is determined. A first phone call is placed to the source phone number, if it is within the member's COS. A second phone call is placed to the destination phone number if it is within the member's COS. Caller ID information associated with the member's phone in the selected telephone network is communicated to the destination phone. The phone calls are connected to enable communication between the source and destination phones.

20 Claims, 4 Drawing Sheets

SYSTEM AND METHOD FOR PLACING A PHONE CALL THROUGH A SELECTED TELECOMMUNICATIONS NETWORK

CROSS-REFERENCE TO RELATED APPLICATIONS

This application includes subject matter that is related to and claims priority from U.S. Provisional Patent Application Ser. No. 61/205,946 filed on Jan. 26, 2009.

BACKGROUND

Caller identification information, referred to as caller ID, is typically sent during most phone calls. The caller ID usually includes a name and the phone number of a caller. The caller ID information can be very helpful to a person receiving a call. For example, by learning the identity of the caller in advance, a person can be prepared to talk with the caller prior to answering the phone. In addition, time can be saved by allowing unknown callers to be sent to voice mail. The process of reviewing the identity of callers prior to answering the phone call is referred to as screening.

The practice of screening can be a challenge when phone calls are made from atypical phones. For instance, a business person may use his home phone or cell phone to conduct business after office hours. In addition, a business cell phone may be used when conducting business away from the person's usual place of business. However, the person receiving the phone call may not recognize the name and number displayed in the caller ID that is associated with the atypical phone used at locations other than the place of business. Since the caller ID is not recognized, the person receiving the call is more likely to screen the call, allowing it to be answered by voice mail, or disregarding it all together. Even fellow employees within a place of business may be more likely to screen a phone call if the caller ID does not display a known number, such as an internal extension of a phone located within the place of business.

Thus, the use of phones outside of the place of business can significantly reduce the efficiency and effectiveness of placing phone calls and conducting business over the phone. This can lead to reduced efficiency and frustration for employees that travel or work at home or other locations external to the place of business.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

In order to reduce the number of calls that are screened or dropped when a person is using a phone that is not part of the telecommunications network used at his or her business location, a system and method for placing a phone call from a selected telecommunications network is disclosed. Rather than directly calling from a phone that operates outside the business telecommunications network, a digital data network connection (such as an internet connection) with the place of business can enable a member of the network to log in to the member's account and use the business telephone network to enable a first call to be made from the business to the member's source phone, such as his or her cell phone. A second call can be made from the place of business to a desired destination phone. The two phone calls can then be connected using proprietary software operating on an application server that is in communication with the business's telecommunications network. The caller ID information that is transmitted for display at the destination phone is configured to show the member's business telephone caller ID information. The person answering the call at the destination phone will be unaware, based on the caller ID displayed at the destination phone, that the phone call did not originate from the member's business telephone.

In addition, the process of using a digital data network connection to allow the phone call to originate within the business's telecommunications network can significantly reduce fees and costs that are incurred through the use of additional phones, such as cell phones. Businesses are often able to negotiate substantial savings for phone calls that originate within the business telecommunications network. However, long distance, roaming, and international fees can be substantial for employees traveling or working at outside locations. Enabling a phone call to originate from within the business telecommunications network can provide significant savings.

Moreover, the same monitoring software used to control telephone usage and costs within a business can be used to maintain control of phone calls initiated through the digital data network connection. For example, a phone call initiated through the digital data network connection can be limited to a member's class of service, as designated by the business's telecommunications network.

Figure 1A:
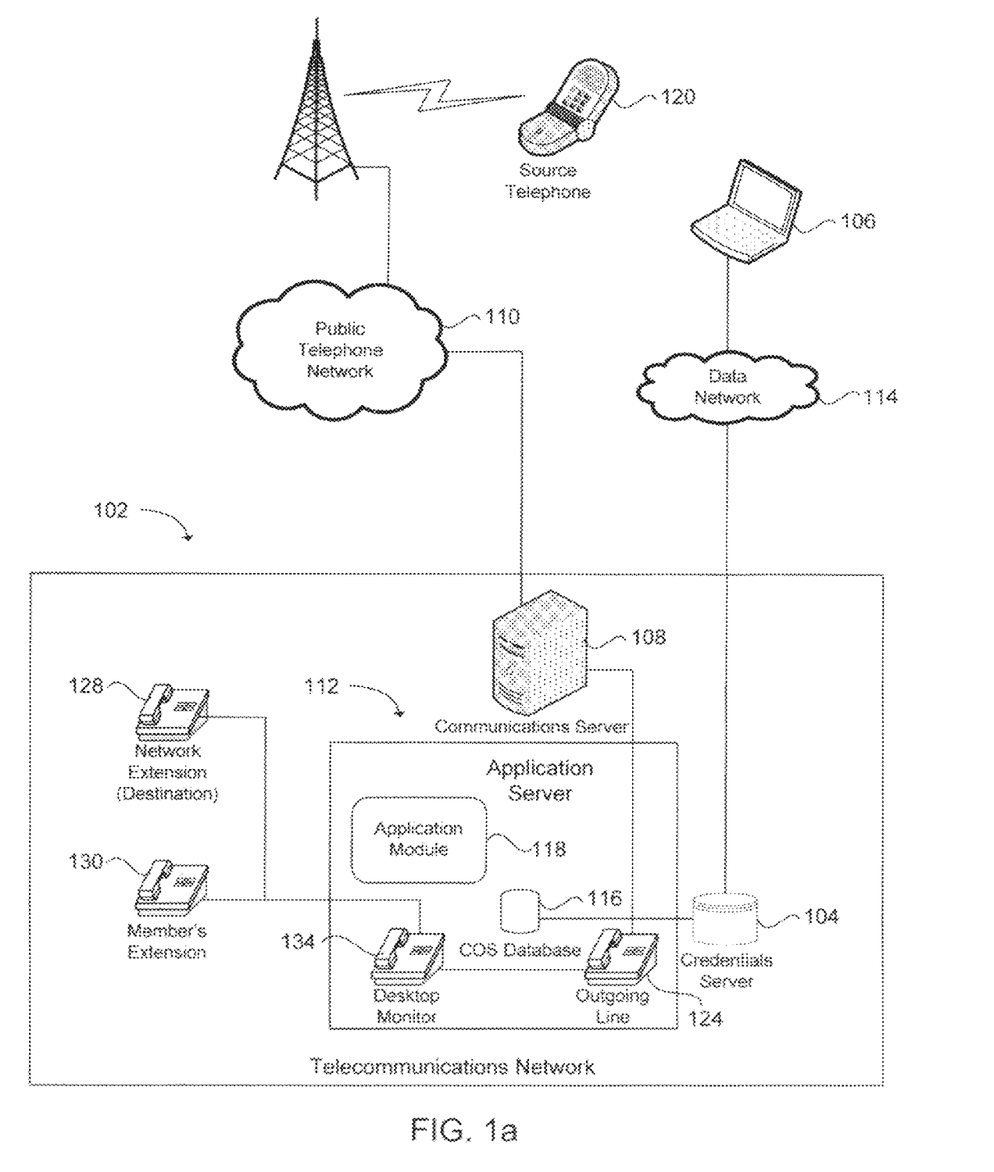
FIG. 1a illustrates a block diagram for a system for placing a phone call through a selected telecommunications network in accordance with one embodiment of the present invention.

In accordance with one embodiment, FIG. 1a provides an example illustration of a system for placing a phone call through a selected telecommunications network 102. The system can include a credentials server 104. The credentials server is configured to receive access credentials from a member of the selected telecommunications network and provide access to the network. While the credentials server is illustrated in FIG. 1a as being located within the selected telecommunications network, the credentials server can also be located external to the telecommunications network. The credentials server may also be incorporated in a communications server 108 or an application server 112.

The system further comprises a computer device 106 that is in communication with the credentials server 104. The computer device is configured to receive access credentials from a member of the selected telecommunications network. The computer device can be a desktop computer, a laptop computer, a handheld computer, such as a smart phone, or another type of device configured to communicate information to the selected telecommunications network. The access credentials entered into the computer device are communicated from the computer device to the credentials server 104. The access credentials may be a user name or other form of user identification. Alternatively, in order to enhance security, a user name and a password, biometric information such as a finger print, retinal scan, or other substantially unique biometric identifier, or another other means of identifying a member of the telecommunications network can be used.

A member of the network 102 is typically an employee of a business or group of businesses having a private telecommunications network. The telecommunications network includes at least one communications server 108, such as a private branch exchange (PBX) server, or other type of communications server capable of providing a private telecommunications network that can be linked to the public telephone network 110. Additional people that are not employees may also be given access to the selected telecommunications network 102, and are also considered to be members of the network. In one embodiment, a member is anyone that has been given credentials to enter the telecommunications network.

Each member can have selected access to the communications server 108. The selected access is typically referred to as the class of service (COS). For example, the class of service for typical employees may allow them to make phone calls from their office phone only to local phone numbers. Employees located in the purchasing department may be allotted a class of service that allows them to make long distance calls within North America. Employees, such as international sales people and corporate heads of the business, may be assigned a class of service that allows them to make calls world wide.

The system further comprises an application server 112. The application server is configured to be in communication with the communications server 108. The application server can also be in communication with the computer device 106 through a data network 114, such as a local area network, a wide area network, or the internet. The application server can include a COS database 116 that contains the class of service for a plurality of the members of the telecommunications network 102. The COS database typically contains the class of service for each of the members of the network. While the COS database is shown as being part of the application server, it may also be located within other portions of the telecommunications network. For example, it may be located in the communications server 108, or another server that is in communication with the communications server. In addition, the programs operating on the application server 112 and the communication server 108 can be located on a single sever. The programs can also operate through a single application, as can be appreciated.

When a member of the telecommunications network 102 successfully enters his or her credentials and the credentials are accepted by the credentials server 104, the member is given access to the telecommunications network based on the member's class of service, as set up in the COS database 116.

The system further comprises an application module 118. The application module can operate on the application server. The application module 118 is configured to receive phone number information comprising a source telephone number and a destination telephone number from a member. The phone number information may be provided to the application module via a number of means. For example, the member can enter one or more of the destination and source phone numbers through a phone that the member uses outside of the telecommunications network 102. The phone that the member uses outside of the telecommunications network 102 is referred to herein as the source telephone 120. The source telephone can communicate with the application module 118 via the communications server 108.

In another embodiment, the phone number information can be communicated to the application module via the computer device 106 through the data network 114. Communicating the phone number information via the computer device may be more cost effective, since using the source telephone outside of the telecommunications network may require making a long distance call.

In one embodiment, the source telephone 120 and the computer device 106 can be comprised in a single device, such as a smart phone. A member may access the telecommunications network via the smart phone through a graphical user interface to input the member's access credential information and phone number information.

Figure 2:
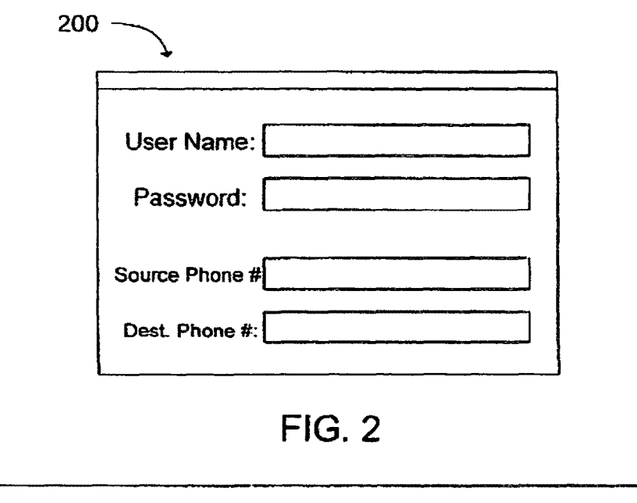
FIG. 2 illustrates an example graphical user interface for submitting information to the telecommunications network in accordance with one embodiment of the present invention.

For example, FIG. 2 shows one example embodiment of a graphical user interface 200 used to obtain access to the telecommunications network and enter phone number information. The GUI may also contain additional information, as will be further discussed below. The GUI may be part of a stand alone program loaded on the computer device 106 (or smart phone), as shown in FIG. 1a. Alternatively, the GUI can be a web module operating on a server, such as the application server 112, and accessed in a web browser of the computer device via the data network 114.

The application module 118 is further configured to place a first telephone call on an outgoing line 124 through the communication server 108 to a source phone 120 associated with the source phone number that was previously submitted to the application module. In one embodiment, the application module 118 can first determine if the source phone number is within the class of service of the member. If the source phone number is a long distance number or international number that is outside of the member's class of service, a message may be sent to the member's computer device that the call cannot be made since it is outside the member's COS.

Alternatively, the COS database can be operable with the communications server 108. In this case the application module can instruct the communications server to place the first phone call. If the first phone call is outside of the member's COS, a notification can be sent to the application module 118 on the application server 112. The message may then be sent, as discussed above.

The application module 118 can then place a second telephone call to a destination phone 128 associated with the destination phone number. The first telephone call and the second telephone call are then connected to enable communication between the source phone 120 and the destination phone 128 through the communication server 108 located in the selected telecommunications network 102. In one embodiment, when the member answers the call on his or her source phone, they will be listening to the call progress tones for the call to the destination phone 128, such as ringing, voice mail, and so forth. If the call is not answered, the member has the option of leaving a message or hanging up, as with any normal call.

The application module 118 is also configured to send caller identification information to the destination phone 128. The caller identification information is associated with the member's telephone 130 that is located within the selected telecommunications network 102. The caller identification information that is sent can be configured as desired. However, the information is typically the same information that would be sent if the member was using his or her phone 130 that is located within the telecommunications network.

The caller identification information may be shown as the member's extension number for calls to other phones made within the telecommunications network. In one embodiment, the caller identification information for the member's phone can be accessed via the COS database 116 based on the member's credentials that were submitted to the credentials server 104. As previously discussed, providing the member's caller ID information enables calls made outside the telecommunications network to have the same caller identification information as calls made within the network, thereby increasing the likelihood that a person will answer the call at the destination phone.

Figure 1B:
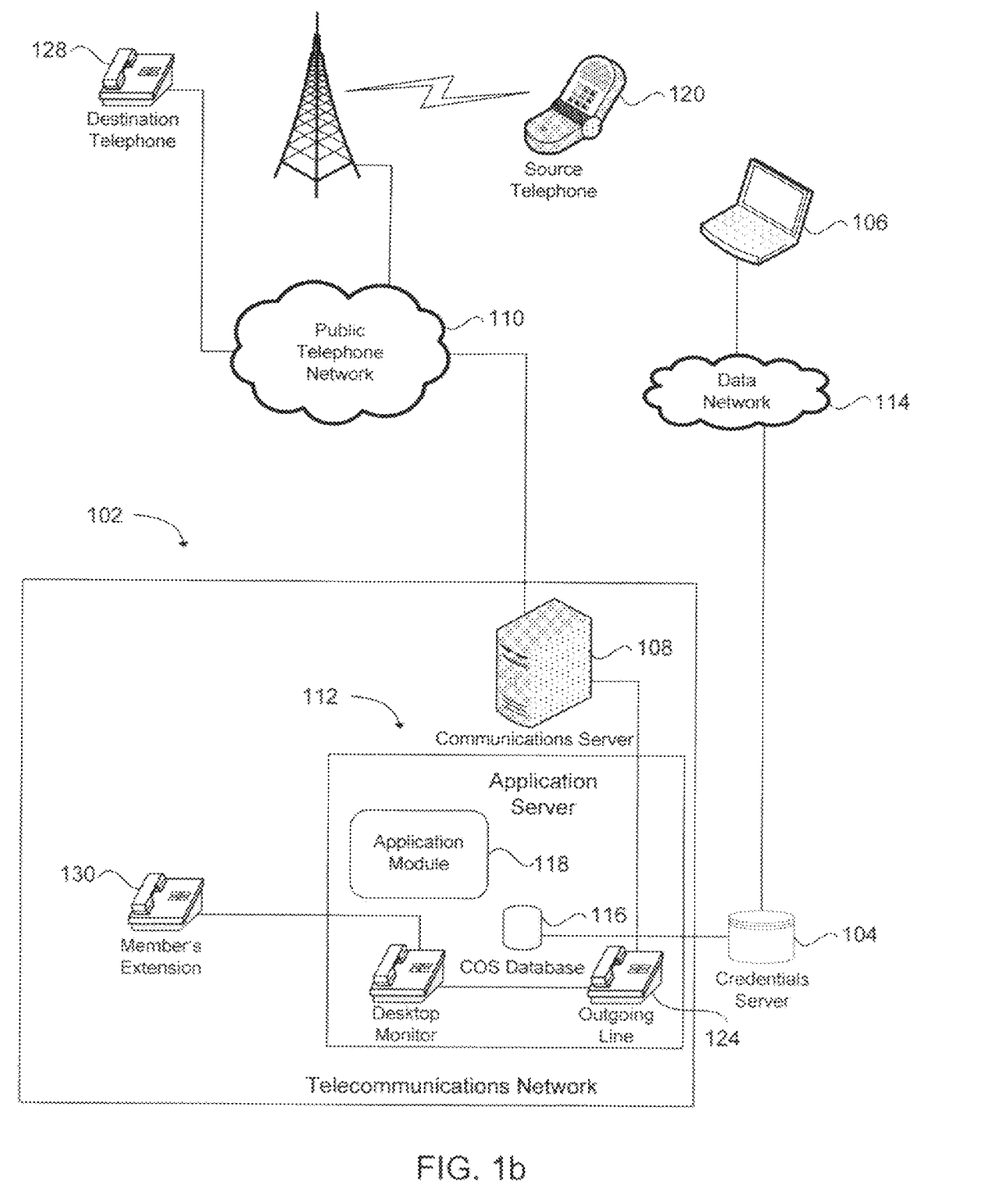
FIG. 1b illustrates a block diagram for a system for placing a phone call through a selected telecommunications network with a destination phone located outside the network in accordance with one embodiment of the present invention.

In another embodiment, the destination phone 128 may be located outside of the telecommunications network 102. For example, FIG. 1b shows the destination phone 128 located outside the telecommunications network. The credentials server 104 is also located outside the network and configured to provide access to the telecommunications network, as previously discussed. When the destination phone 128 is located outside the telecommunications network, the application server can be configured to determine if a phone call made to the destination phone is within the member's class of service, based on the destination phone number submitted to the application server 112. Alternatively, the application module can instruct the communications server 108 to place the second phone call. If the second phone call is outside of the member's COS, as determined by the communication server 108, a notification can be sent from the communication server to the application module 118 on the application server 112. A message may then be sent, as discussed above.

If the phone call is outside, the member's COS, such as a phone number outside of the long distance area or out of the country, then a message may be sent to the source phone identifying that the phone call cannot be connected because it is outside of the member's COS. Alternatively, the member's COS may be altered, or a second COS entry may be entered in the COS database 116 to allow a member to place phone calls outside of the telecommunications network (i.e. through the application server when outside the office or business) that otherwise would not be allowed when the user is actually calling from the user's extension 130.

Figure 3:
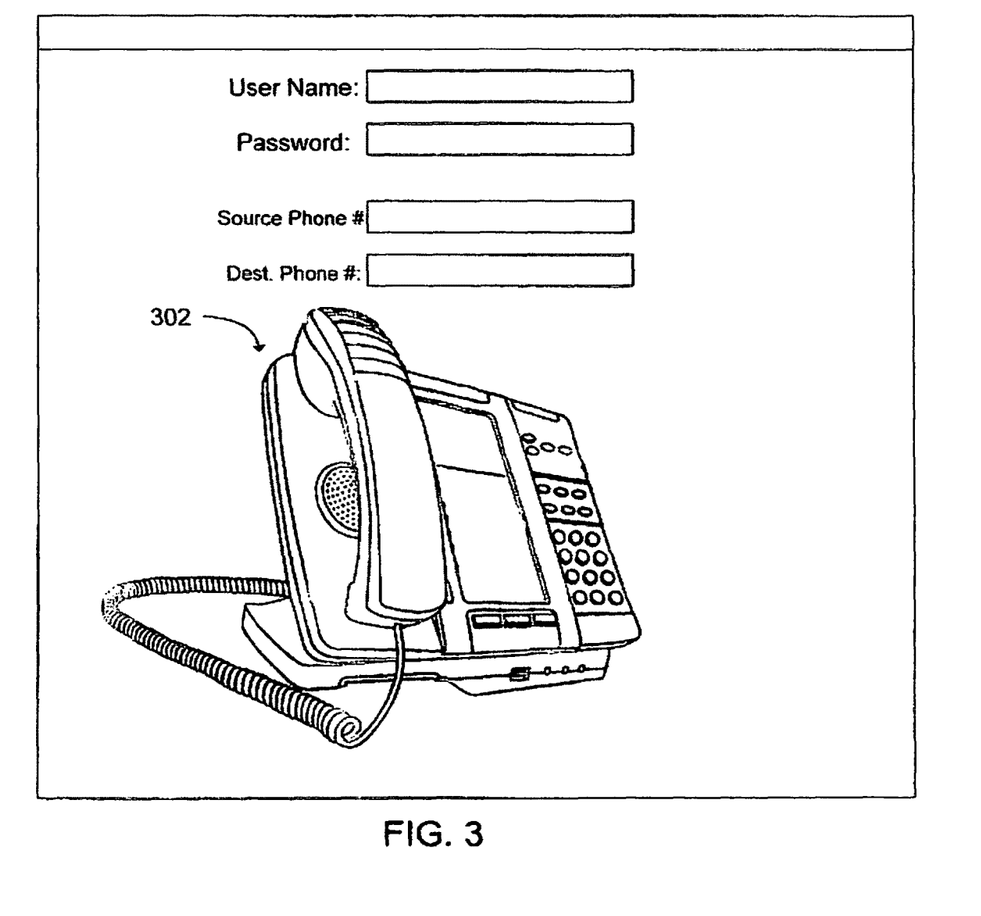
FIG. 3 illustrates another example of a graphical user interface for submitting information to the telecommunications network in accordance with another embodiment of the present invention.

The graphical user interface (GUI) can be expanded to include additional controls and abilities. For example, the GUI can include any of the controls available to the member when using the member's extension within the office. One example embodiment is shown in FIG. 3, wherein an image of the member's office phone is provided in the GUI that allows the member to access substantially all of the features of the phone by pressing the "buttons" on the image. Alternatively, a simplified GUI may be presented that provides selected features of the member's phone 130 used within the telecommunications network 102. For instance, selected features such as mute, call forwarding, conference calling, electronic phone books, access to voice mail, speaker phone, call transfer, and paging and so forth can be provided.

In one embodiment, a callback feature can be implemented. If the destination phone rings busy, the member can be given the option to be called back when the destination phone is idle. The desktop monitor 134 can be used to monitor the status of the destination phone 128, as shown in FIG. 1*a*. The desktop monitor interacts with the telecommunications network using suitable protocol(s) supported by the telecommunications network server. When the desktop monitor detects that the destination phone's status has changed to idle, the system can again place the first and second telephone calls to the source and destination phones, respectively. The caller ID of the member's phone can be sent to the destination phone. The destination phone's caller ID can be sent to the source phone so that the member can identify the source of the incoming call. Alternatively, information may be sent from the application server 112 to the source phone to identify the call as a callback.

Figure 4:
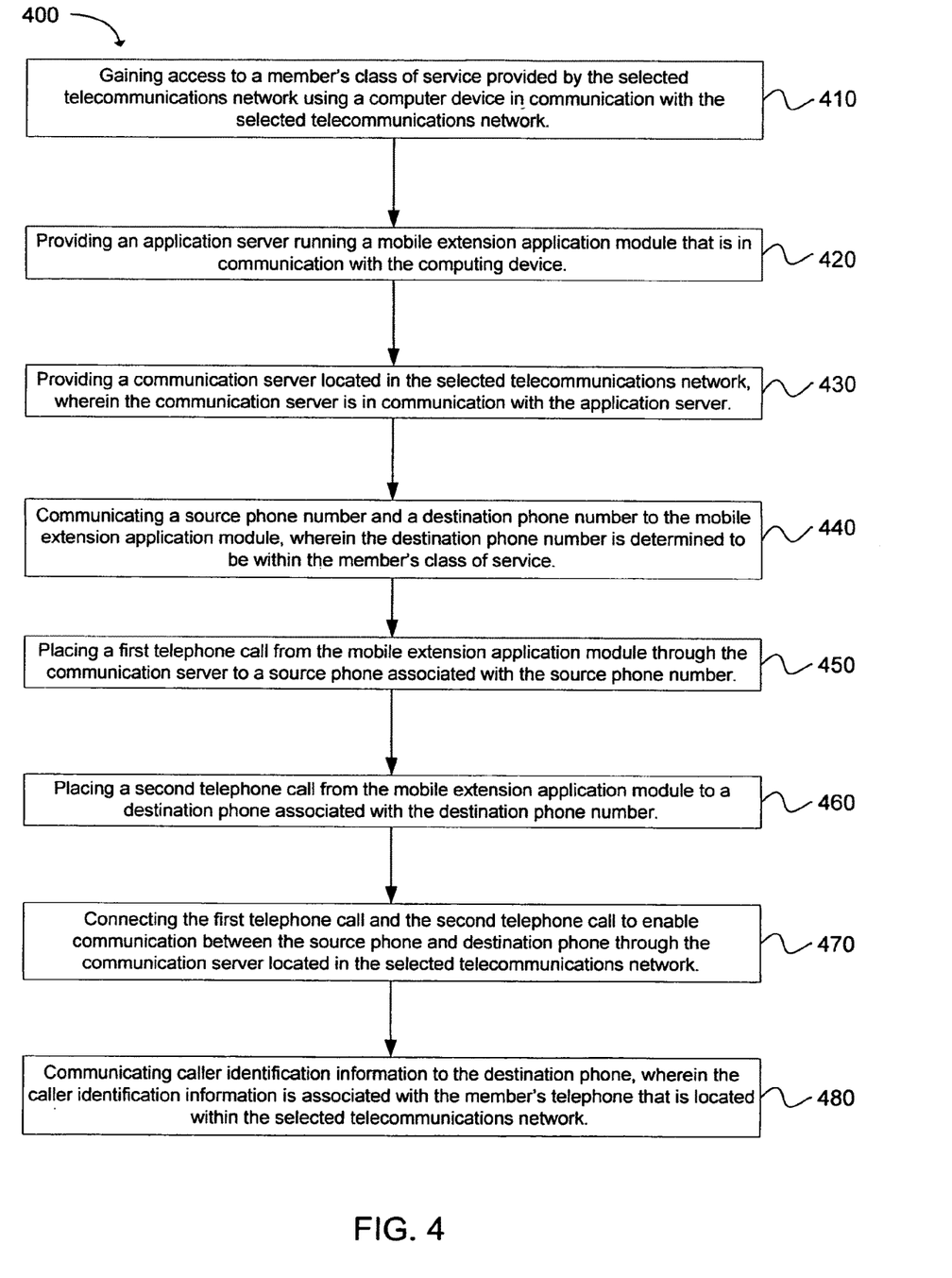
FIG. 4 depicts a flow chart for a method for placing a phone call through a selected telecommunications network in accordance with an embodiment of the present invention.

In another embodiment, a method 400 for placing a phone call through a selected telecommunications network is disclosed, as depicted in the flow chart of FIG. 4. The method includes the operation of gaining 410 accesses to a member's class of service provided by the selected telecommunications network using a computer device in communication with the selected telecommunications network. In one embodiment, the computer device may be connected to a credentials server that is in communication with the selected telecommunications network. An application server running a mobile extension application module is provided 420 that is in communication with the computer device. A communication server located in the selected telecommunications network is also provided 430. The communication server is in communication with the application server. A source phone number and a destination phone number are communicated 440 to the mobile extension application module. In one embodiment, the source and destination phone numbers can be entered through a graphical user interface available on the computer device, such as a desktop computer, laptop computer, or mobile computer. The mobile computer may be a smart phone that is the source phone, as previously discussed. A determination 450 is made as to whether the destination phone number is within the member's class of service. A determination may also be made as to whether the source phone number is located within the member's class of service.

The method further comprises placing 450 a first telephone call from the mobile extension application module through the communication server to a source phone associated with the source phone number. A second phone call is placed 460 from the mobile extension application module to a destination phone associated with the destination phone number. The first telephone call and the second telephone call are connected 470 to enable communication between the source phone and destination phone through the communication server located in the selected telecommunications network. Caller identification information is communicated 480 to the destination phone that is associated with the member's telephone which is located within the selected telecommunications network.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for placing a phone call through a selected telecommunications network, comprising:
    accessing a member's class of service provided by the selected telecommunications network using a computer device in communication with the selected telecommunications network, the member's class of service provides selected access to a communication server;
    providing an application server running an application module that is in communication with the computer device;
    providing the communication server located in the selected telecommunications network, wherein the communication server is in communication with the application server;
    communicating a source phone number and a destination phone number to the application module;
    placing a first telephone call from the application module through the communication server to a source phone associated with the source phone number;
    determining if the destination phone number is within a member's class of service;
    placing a second telephone call from the application module to a destination phone associated with the destination phone number if it is determined that the destination phone number is within the member's class of service;
    connecting the first telephone call and the second telephone call to enable communication between the source phone and destination phone through the communication server located in the selected telecommunications network;
    accessing caller identification information for a member's telephone that is located within the selected telecommunications network; and
    communicating the caller identification information for the members telephone that is located within the selected telecommunications network to the destination phone.

2. The method of claim 1, wherein accessing a member's class of service further comprises submitting a member's access credentials to a credentials server in communication with the selected telecommunications network through the computer.

3. The method of claim 1, wherein communicating the source and destination phone numbers further comprises entering a source phone number and a destination phone number through a graphical user interface operating on the computer device, wherein the computer device is selected from at least one of a desktop computer, a laptop computer, a mobile computer, and the source phone configured as a smart phone.

4. The method of claim 1, wherein providing the communication server located in the selected telecommunications network further comprises providing at least one of an Internet Protocol server and a circuit switched private branch exchange (PBX) server to form the selected telecommunications network.

5. The method of claim 1, wherein placing the first telephone call further comprises determining if the source phone number is within the member's class of service.

6. The method of claim 5, further comprising sending a message to the member when at least one of the source phone number and the destination phone number is outside of the member's class of service.

7. The method of claim 1, wherein accessing the member's class of service further comprises accessing a class of service database operating on a server in communication with the communication server.

8. The method of claim 1, further comprising providing an option for the member to select a callback when the destination phone is busy.

9. A system for placing a phone call through a selected telecommunication network, comprising:
a credentials server;
a class of service (COS) database in communication with the selected telecommunications network, the database comprising a class of service for each of a plurality of members of the telecommunication network, each member's class of service provides selected access to a communication server;
a computer device in communication with the credentials server and configured to receive access credentials from a member of the selected telecommunications network and provide access through the credentials server to the selected telecommunications network, wherein the access is limited to the member's class of service contained in the COS database;
an application server in communication with the computer device;
the communication server located in the selected telecommunications network that is in communication with the application server;
an application module operating on the application server that is configured to:
receive a source telephone number and a destination telephone number;
place a first telephone call through the communication server to a source phone associated with the source phone number;
determine if the destination telephone number is within the member's class of service;
place a second telephone call to a destination phone associated with the destination telephone number if it is determined that the destination telephone number is within the member's class of service;
connect the first telephone call and the second telephone call to enable communication between the source phone and destination phone through the communication server located in the selected telecommunications network;
access caller identification information for a member's telephone that is located within the selected telecommunications network; and
send the caller identification information for the member's telephone that is located within the selected telecommunications network to the destination phone.

10. The system of claim 9, further comprising a graphical user interface (GUI) operable on the computer device that is organized to receive at least one of the access credentials, the source phone number, and the destination phone number.

11. The system of claim 9, wherein the communications server is configured to determine whether at least one of the first and second telephone calls are within the member's class of service and report the information to the application module.

12. The system of claim 10, wherein the computer device is integrated with the source phone to form a smart phone operable to display the graphical user interface and communicate the source and destination phone numbers to the application module operating on the application server.

13. The system of claim 9, wherein the computer device is selected from the group consisting of a desktop computer, a laptop computer, a mobile computer device, and a smart phone computer device.

14. The system of claim 10, wherein the graphical user interface is configured to provide selected functionality of the member's telephone that is located within the telecommunications network.

15. The system of claim 14, wherein the graphical user interface is configured to provide functionality of the member's telephone selected from the group consisting of mute, call forwarding, conference calling, access to an electronic phone book, access to voice mail, speaker phone, call transfer, and paging.

16. The system of claim 9, wherein the class of service database comprises a first record for telephone calls made by the member within the telecommunications network and a second record for telephone calls made by the member through the system.

17. A system for placing a phone call through a selected telecommunication network, comprising:
a means for accessing a member's class of service provided by the selected telecommunications network, the member's class of service provides selected access to a communication server;
an application server;
the communication server located in the selected telecommunications network that is in communication with the application server;
an application module operating on the application server that is configured to:
receive a source telephone number and a destination telephone number;
place a first telephone call through the communication server to a source phone associated with the source phone number;
determine if the destination telephone number is within a member's class of service;
place a second telephone call to a destination phone associated with the destination telephone number if it is determined that the destination telephone number is within the members class of service;
connect the first telephone call and the second telephone call to enable communication between the source phone and destination phone through the communication server located in the selected telecommunications network;
access caller identification information for a member's telephone that is located within the selected telecommunications network; and
send the caller identification information for the member's telephone that is located within the selected telecommunications network to the destination phone.

18. The system of claim 17, further comprising:
a credentials server; and
a class of service (COS) database in communication with the selected telecommunications network, and wherein the means for accessing the member's class of service is a computer device in communication with the credentials server and configured to receive access credentials from a member of the selected telecommunications network and provide access through the credentials server to the selected telecommunications network, wherein the access is limited to the member's class of service contained in the COS database.

19. The system of claim 18, further comprising a graphical user interface (GUI) operable on the computer device that is configured to receive at least one of the access credentials, the source phone number, and the destination phone number, and wherein the computer device is integrated with the source phone to form a smart phone operable to display the graphical user interface and communicate the source and destination phone numbers to the application module operating on the application server.

20. The system of claim 19, wherein the graphical user interface is configured to provide functionality of the member's telephone selected from the group consisting of mute, call forwarding, conference calling, access to an electronic phone book, access to voice mail, speaker phone, call transfer, and paging.

\* \* \* \* \*